United States Patent
Lechat et al.

(10) Patent No.: US 6,999,629 B1
(45) Date of Patent: Feb. 14, 2006

(54) IMAGE CODING/DECODING METHOD

(75) Inventors: Patrick M. Lechat, Prades le Lez (FR); Nathalie Laurent-Chatenet, Rennes (FR)

(73) Assignee: France Telecom and Telediffusion De France, Paris (FR)

(*) Notice: Subject to any disclaimer, the term of this patent is extended or adjusted under 35 U.S.C. 154(b) by 0 days.

(21) Appl. No.: 09/980,107

(22) PCT Filed: May 24, 2000

(86) PCT No.: PCT/FR00/01414

§ 371 (c)(1),
(2), (4) Date: Apr. 17, 2002

(87) PCT Pub. No.: WO00/73997

PCT Pub. Date: Dec. 7, 2000

(30) Foreign Application Priority Data

May 26, 1999 (FR) .................................. 99 06813

(51) Int. Cl.
*G06K 9/36* (2006.01)
(52) U.S. Cl. .................................................. 382/240
(58) Field of Classification Search ........ 382/232–233, 382/236, 240, 241, 243, 248, 250; 345/419, 345/423, 582, 586
See application file for complete search history.

(56) References Cited

U.S. PATENT DOCUMENTS

| | | | |
|---|---|---|---|
| 5,654,771 A | * | 8/1997 | Tekalp et al. ............... 348/699 |
| 5,903,682 A | * | 5/1999 | Chun ......................... 382/276 |
| 6,047,088 A | * | 4/2000 | van Beek et al. ............ 382/243 |
| 6,144,773 A | * | 11/2000 | Kolarov et al. ............. 382/240 |
| 6,738,520 B1 | * | 5/2004 | Acharya et al. ............ 382/232 |
| 6,795,070 B1 | * | 9/2004 | Laurent-Chatenet et al. ......................... 345/423 |

FOREIGN PATENT DOCUMENTS

| | | |
|---|---|---|
| EP | 0 808 066 A2 | 11/1997 |
| WO | WO 98/27515 | 6/1998 |

OTHER PUBLICATIONS

"Scalable Image Coding with Fine Granularity Based on Hierarchical Mesh," by P. Lechat et al., XP000862993, pp. 1130-1142 (Jan. 1999).

"Very Low Bit Rate Video Coding Using Active Triangular Mesh," by P. Salembier et al., XP000681654, pp. 2060-2063 (May 7, 1996).

"Interframe Coding Using Deformable Triangles of Variable Size," by M. Yazdi et al., SP000792810, pp. 456-459 (Oct. 26, 1997).

* cited by examiner

*Primary Examiner*—Jose L. Couso
(74) *Attorney, Agent, or Firm*—Shewchuk IP Services, LLC; Jeffrey D. Shewchuk (57) ABSTRACT

An image coding method for a domain corresponding to at least one portion of an image. A minimal triangular partition covering the domain is defined. A square matrix is associated with each of the source triangles by a first reversible transformation so that each matrix represents a specific source triangle. A second reversible decorrelation transformation is applied to each square matrix, resulting in transformed matrixes. The method may be used in isolation, or as a supplement to another coding of the hierarchic type. A corresponding decoding method is also provided.

25 Claims, 4 Drawing Sheets

| 16 | | | | | | | |
|---|---|---|---|---|---|---|---|
| 12 | 12 | | | | | | |
| 14 | 13 | 16 | | | | | |
| 14 | 17 | 22 | 29 | | | | |
| 18 | 22 | 37 | 56 | 68 | | | |
| 24 | 35 | 55 | 64 | 81 | 104 | | |
| 49 | 64 | 78 | 87 | 103 | 121 | 120 | |
| 72 | 92 | 95 | 98 | 112 | 100 | 103 | 99 |

IMAGE CODING/DECODING METHOD

CROSS REFERENCE TO RELATED APPLICATION

This application is Section 371 application based on International Application No. PCT/FR00/01414 filed May 24, 2000, and published as WO 00/73997A1 on Dec. 7, 2000 not in English.

FIELD OF THE INVENTION

The field of the invention is that of the encoding of still or moving images. More specifically, the invention relates to image compression techniques or image sequence compression techniques based on the implementation of invertible mathematical transformations.

BACKGROUND OF THE INVENTION

There are very many known techniques of image compression, used to reduce the quantity of data needed to represent an image or a sequence of moving images. Thus, it is sought especially to reduce the bit rates of the digital signals in order to transmit them and/or to store them on a data carrier.

The invention can be applied especially but not exclusively to the transmission of image signals at low bit rate as well as to transmission without bit rate guarantee, as in the case of transmission made according to the IP ("Internet Protocol").

Among the many known image-encoding methods, it is possible to distinguish especially the ISO-JPEG and ISO-MPEG techniques which have given rise to a standard. These encoding techniques rely especially on the implementation of transforms, enabling the efficient elimination of redundancy in an image.

Figures 1, 3:
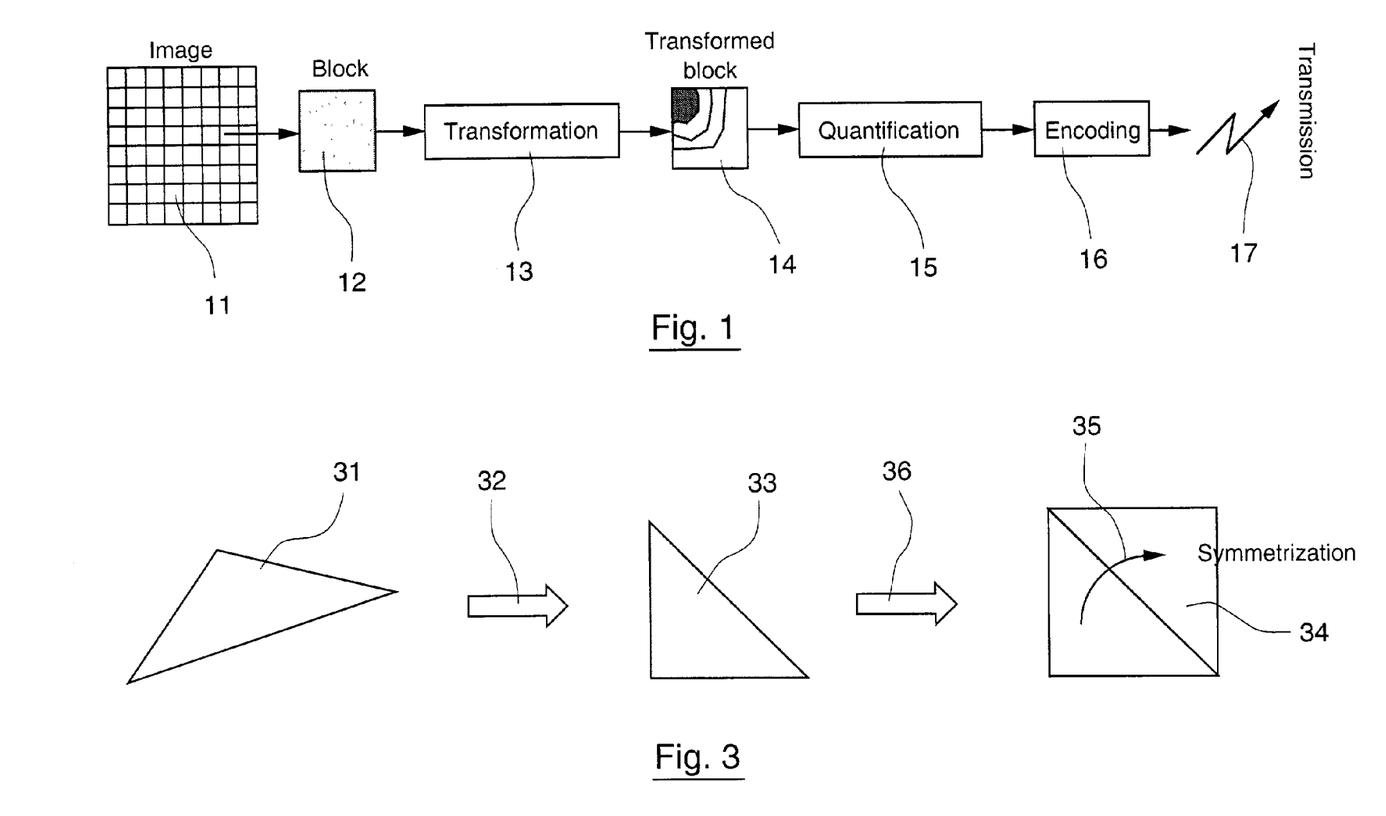
FIG. 1, already referred to in the introduction, illustrates the prior art technique of an encoding implementing a transform.
FIG. 3 illustrates the principle of the second and third steps of the method of FIG. 2.

FIG. 1 illustrates the general principle of a method of encoding by transform.

The image 11 to be encoded is first of all partitioned into a set of non-overlapping rectangular blocks 12 of the same size, to which a invertible transformation 13 is applied. This transformation generates a transformed block 14, formed by a set of transformed coefficients which are less correlated than the coefficients of the original block 12.

These coefficients then undergo a quantification 15 and then an encoding 16 before being transmitted (17) on the channel, or stored.

If the luminance of the pixel having coordinates (x,y) is referenced I(x,y) and if it is assumed that the image to be encoded 11 has been partitioned into M×N sized blocks 12, the application of a block-oriented transformation 13 a(x, y, m, n) will produce an image F with:

$$F(m, n) = \sum_{x=0}^{M-1} \sum_{y=0}^{N-1} I(x, y) a(x, y, m, n) \quad (1)$$

where m ∈ [0,M−1] and n ∈ [0,N−1].

From the transformation a(x, y, m, n), an inverse transformation b(x, y, m, n) can be defined in order to reconstruct the original image I:

$$I(x, y) = \sum_{x=0}^{M-1} \sum_{y=0}^{N-1} F(m, n) b(x, y, m, n) \quad (2)$$

The main transformations used in image compression are:
the Karhunen Loève transformation (KLT),
the discrete Fourier transformation (DFT),
the discrete cosine transformation (DCT),
and the Walsh-Hadamard transformation (WHT).

It must be noted that the transformation operation 13, applied by itself, makes no compression of the image since its sole purpose is to decorrelate the original data and concentrate the greatest part of the energy in a small number of transformed coefficients. Since the total energy is preserved, most of the transformed coefficients contain very little energy, and it is therefore the efficient quantification 15 and efficient encoding 16 of these coefficients that will enable the compression.

A high-quality transformation must provide for efficient decorrelation. It must be independent of the processed images and it must possess fast algorithms providing for efficient implementation.

The technique that proves to be most efficient for the decorrelation of a signal is the KLT technique. Unfortunately, it is dependent on the manipulated images (because the statistics of the signal have to be calculated in order to deduce its transform). There are therefore no fast algorithms providing for efficient implementation. This limits its use.

However, for typical images in which there is a strong correlation between the pixels, the performance of the DCT is very close to that of the KLT. Furthermore, the DCT has many fast algorithms providing for efficient implementation. Furthermore, it does not depend on the manipulated images. Finally, it introduces fewer inter-block deformations than the DFT.

If we consider the equation (1), the DCT is obtained by taking:

$$a(x, y, m, n) = \frac{2c(m)c(n)}{\sqrt{MN}} \cos\left(\frac{(2x+1)\pi m}{2M}\right) \cos\left(\frac{(2y+1)\pi n}{2N}\right) \quad (3)$$

With:

$$c(w) = \begin{cases} \frac{1}{\sqrt{2}} & si\ w = 0 \\ 1 & sinon \end{cases}$$

Different compression standards use an approach relying on the DCT, such as JPEG for the fixed images, H261 and H263 for the video sequences with a view to visiophone and visioconference type applications using CIF (Common Intermediate Format) and QCIF (Quarter CIF) format images and finally MPEG (1, 2, and 4) images for video sequences having any contents whatsoever, with a view to digital television type applications.

This standard technique however has several drawbacks due especially to the fact that the processing does not take account of the contents of the original image. Indeed, the partitioning of the image relies on a regular and systematic cutting into squares thus generating the effect of blocks, and does not take the sudden transitions between different zones of the image.

Furthermore, the techniques implementing the transformations lend themselves poorly to geometrical manipulation (zooming-in, rotation or geometrical warping) which are conventionally used to determine the compensation for a motion between two consecutive images in the context of moving images or to obtain the integration of natural images in synthetic scenes.

The invention is designed especially to overcome these drawbacks of the prior art.

More specifically, an object of the invention is to provide a method for the encoding of fixed or moving images based on the implementation of a invertible transformation based on a different partition based on triangles. It must be noted that the simple formulation of this goal amounts to an inventive step. Indeed, at the present time, the main approaches using transforms imply a partitioning into square blocks or a breakdown into regions of any shape but do not provide the flexibility of use of a partition by meshing.

A particular goal of the invention is to provide a method of this kind wherein the triangular partition is adapted to the semantic contents of the image or the sequence of images.

Another goal of the invention naturally is to provide an encoding method of this kind that gives high cost effectiveness of encoding (namely a good ratio between the reconstruction of the image and the quantity of data to be transmitted and stored).

A goal of the invention is also to provide an encoding method of this kind that is relatively easy to implement and especially does not require a large number of additional complex operations as compared with known techniques.

A complementary goal of the invention, in a particular embodiment, is to provide an encoding method of this kind that can be implemented selectively on portions of images as a complement to another approach.

Another goal of the invention is to provide a corresponding decoding method that enables the reconstruction of images simply and at low cost (in terms of processing time, storage capacity, etc.).

SUMMARY OF THE INVENTION

These goals as well as others that shall appear more clearly hereinafter are achieved according to the invention by means of an image encoding method comprising, for a field corresponding to a least one image portion, the following steps:
the definition of a minimum triangular partition overlapping said domain;
the association, with each of said source triangles, of a square matrix representing said source triangle, by means of a first invertible transformation;
the application of a second decorrelating invertible transformation to each of said square matrices, delivering transformed matrices.

Thus, according to the invention, it is possible to apply a invertible transformation technique to the images which are broken down not into squares but triangles, these triangles being of any possible shape (in terms of size and orientation) and being different from one another. In particular, they may be adapted to the contents of the image.

It is thus possible to combine the advantages of techniques based on transformations and those of the techniques implementing a breakdown into triangles without the additional processing operations being excessively greater than the transformations performed on square blocks.

Advantageously, said step of associating a square matrix comprises the following steps:
the affine transformation of a source triangle into an isosceles rectangular triangle called a reference triangle;
the creation of a square matrix whose lower part includes data representing said isosceles rectangular triangle;
the symmetrizing of said square matrix.

These operations, and the reverse operations, are indeed very simple to implement.

According to a preferred embodiment of the invention, said square matrix is obtained by means of a bilinear interpolation.

Advantageously, said step for the creation of a square matrix implements a scale factor $\alpha$ enabling an expansion or compression in the space domain. It is thus easy to adapt a number of data elements needed to encode the image as a function of needs and/or available resources.

In this case, said square matrix may comprise $E(\alpha \times \sqrt{2 \times A})$ lines where E represents the function delivering the higher integer part, A being the area of said isosceles rectangular triangle.

Said second transformation may belong in particular to the group of the usual transformations in the field such as for example:
the Karhunen Loève transformation (KLT),
the discrete Fourier transformation (DFT),
the discrete cosine transformation (DCT),
and the Walsh-Hadamard transformation (WHT).

As shall be seen hereinafter, the DCT presently seems to be the best suited method.

Preferably, the image encoding method according to the invention then comprises a step for the quantification and encoding of data of the lower part of said transformed matrix. Most of the quantification and encoding techniques can be used.

In particular, said quantification may advantageously belong to the group comprising:
a uniform quantification;
a zigzag route quantification, the quantification pitch being incremented as and when said route is travelled;
a quantification based on at least one weighting matrix that is pre-evaluated or optimized for the processed image.

Furthermore, the encoding preferably comprises a step of RLE (Run Length Encoding) and entropic encoding of the quantified data.

Advantageously, the method of the invention can be parametrized. In particular, it can be planned that said scale factor $\alpha$ the type of quantification and/or the quantification pitch can be modified for each of said triangles and/or for each of said image portions.

The described method can be applied whatever the method used to determine the triangles to be processed. According to an advantageous embodiment, said triangular partition is obtained according to a method that takes account of the contents of the image or the image portion.

In other words, the peaks and ridges of the triangles coincide as much as possible with the transitions of the image considered.

In particular, said method advantageously belongs to the group comprising:
methods implementing a DCT;
methods based on fractal decomposition;

matching pursuit methods;

methods implementing an SADCT ("Shape Adaptive DCT").

The method described here above can of course be applied to a full image (or sequence of images). It can also, in an advantageous embodiment, be implemented on image portions having a texture whose representation error is above a given threshold. Said representation error can especially correspond to a luminance deviation between said source triangle and the triangle after reconstruction.

In this case, the encoding method is preferably implemented on an error image corresponding to the deviation between the source image and an approximate image, obtained by implementing a preliminary distinct method of encoding.

Said preliminary method of encoding may, for example, be a method of approximation by refining that implements a hierarchical mesh from which a quaternary tree is constructed having as many levels as there are levels in said hierarchical mesh, each of said levels having a number of nodes equal to the number of triangles in the corresponding mesh level. In this case, for nodes meeting a predetermined criterion, said preliminary encoding is advantageously replaced by a transform-based encoding as described here above.

According to a preferred embodiment, said predetermined criterion may rely on the luminance deviation between the triangle of the approximate image and that of the source image.

In this case, the processing for each node (it being known that a node corresponds to a triangle for a given level of the tree) is advantageously done as follows:

a luminance deviation between the image to be encoded and the image interpolated on the triangle is computed from the peaks of the nested mesh to which the node considered belongs;

said luminance deviation is compared with a threshold difference;

the following choices are made:
  if said luminance deviation is below said threshold difference, the approximation method is interrupted by the refining of the hierarchical mesh for the node considered;
  if said luminance deviation is above said threshold difference but below a second threshold, said method implementing a hierarchical meshing continues to be applied;
  if said luminance deviation is higher than said second threshold, the encoding method described here above is implemented.

According to a particular embodiment of the invention, said second threshold is equal to k×S with:
  k: real number greater than or equal to 1;
  S: real value proportional to the mean error deviation of luminance.

Preferably, said luminance deviation represents a mean square error or an absolute error between said source triangle and the corresponding approximate triangle.

The invention also pertains to decoders and the decoding of images encoded according to the encoding method described here above. The method of decoding data representing an image encoded according to the encoding method of the invention comprises especially the following steps of reconstruction of an approximation of the original image:

a) the application of a inverse transformation to said second invertible transformation on said transformed matrices, delivering said reconstructed square matrices;

b) the association, with each of said reconstructed square matrices, of a corresponding reconstructed triangle by means of an affine transformation that is the inverse of said first invertible transformation;

c) the reconstruction of said minimum partition from said reconstructed triangle.

In other words, the reconstruction of the encoded images relies especially on the implementation of transformations that are the inverse of those used during the encoding.

In particular, said square matrices may be recreated from data of a received binary string whose decoded data are the coefficients of the triangle to be reconstructed which form the lower part of said matrix.

When a preliminary encoding as described here above has been implemented, the steps a), b) and c) are of course applied to the corresponding part of the received binary string, the other part of the binary string having been encoded and being decoded according to another method.

In particular, when the binary string comprises, firstly, data encoded according to a preliminary encoding method and, secondly, data encoded by means of said invertible transformations, said decoding method comprises:

a preliminary decoding of said data encoded according to a preliminary encoding, enabling the description of an initial representation;

a complementary decoding of said data encoded by means of said invertible transformations, implementing steps a), b) and c) and enabling the refining of said initial representation.

Preferably, with said preliminary encoding implementing a hierarchical encoding, said preliminary decoding provides for the reading, in the received binary string, of at least one of the pieces of information belonging to the group comprising:

the number of levels of the hierarchy;

the identification of the encoding technique used for each of the triangles;

the succession of the differential values of the components associated with the nodes of said hierarchical mesh;

the identification of the arcs on which a diagonal inversion is made.

BRIEF DESCRIPTION OF THE DRAWINGS

Other features and advantages of the invention shall appear more clearly from the following description of a preferred embodiment given by way of a simple illustrative and non-restrictive example, and the appended drawings, of which.

DETAILED DESCRIPTION OF THE PREFERRED EMBODIMENTS

Figure 2:
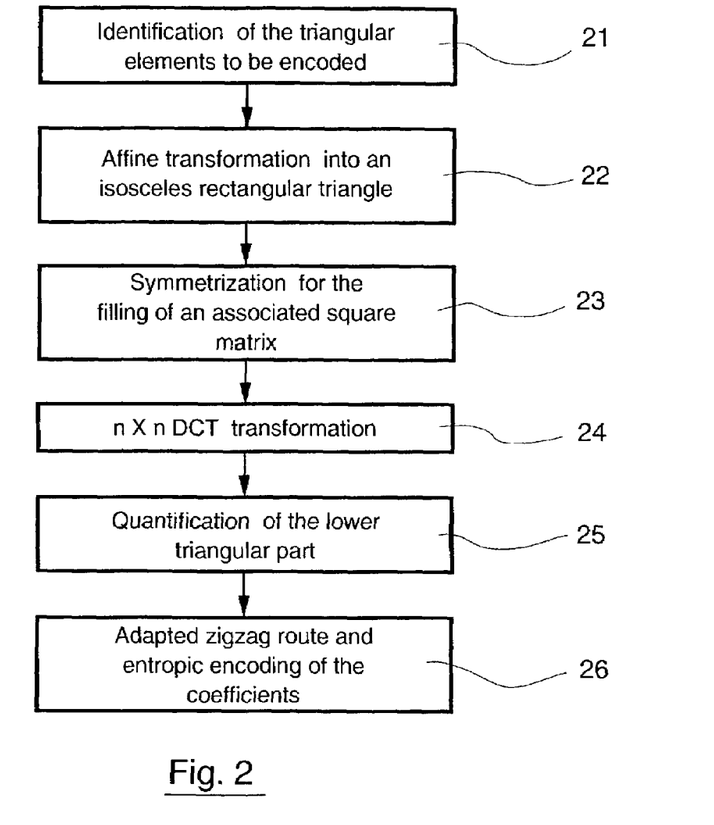
FIG. 2 is a simplified flow chart of the method of the invention.

The invention therefore proposes the implementation of a transformation, for example a DCT transformation, adapted to a triangular partition. FIG. 2 is a general flow chart illustrating the corresponding method.

The processing with node according to the invention is therefore as follows:
- the definition 21, on the domain of the image to be encoded, of a triangular partition which may be adapted to the contents on the domain of the image (or of the image portion or portions to be encoded);
- the determining, for each element of the partition obtained, of transformations by which each triangular element is associated with a reference triangle 22 and than a square (namely a matrix) 23;
- the carrying out of a DCT 24 on each of the matrices;
- the application of a quantification method 25 and an encoding method 26 that may be identical to those of the present standards.

According to the first step 21 of the method of the invention, first of all a triangular partition is defined on the domain of the image. In general, this triangular partition is initially even (although it can also be uneven). It may therefore sometimes be unsuitable, when it is even, for representing an image that has disparities in its contents and/or mixes uniform regions with more textured zones requiring a high density of peaks.

This step 21 therefore advantageously comprises an optimizing of the position of the peaks of the mesh defining the triangles so as to shift the concentrations of peaks of the mesh towards the zones that require it. A technique of this kind is shown for example in the patent document FR-98 12 525 filed on behalf of the owners of the present patent application.

The most immediate visual effect of an optimization of this kind is represented by an approaching of the peaks of the mesh towards the physical contours of the object of the image.

The second and third steps 22 and 23 of the method of the invention are shown in FIG. 3.

For each triangular element 31 of the partition, the method determines the affine transformation 32 enables the association of a reference triangle 33, which is an isosceles triangle, with each triangle 31 of any kind. Then, the reference triangle is converted into a square and more specifically into a square matrix 34 by symmetrization 35.

Figure 4:
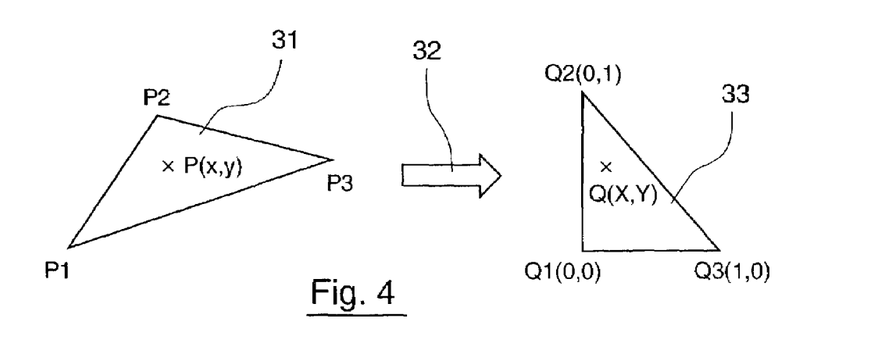
FIG. 4 is a more precise extract of FIG. 3 corresponding to the second step of the method of FIG. 1.

More specifically, the first transformation 32 consists in determining the affine transformation used to pass from any triangle 31 to the reference triangle 33 as shown in FIG. 4.

The invertible affine transformation F such that $P_i = F(Q_i)$, with $P_i = (x_i, y_i)$ and $Q_i = (X_i, Y_i)$, is written as follows:

$$\begin{cases} x = x_1 + (x_3 - x_1)X + (x_2 - x_1)Y \\ y = y_1 + (y_3 - y_1)X + (y_2 - y_1)Y \end{cases}$$

This affine transformation is invertible because the determinant of the matrix is equal (except for the sign) to 2A (where A represents the area of the triangle 31 of any kind), which is assumed to be non-zero. This inverse affine conversion is therefore written as follows:

$$\begin{cases} X = \frac{(x_2 - x_1)(y_1 - y) + (y_1 - y_2)(x_1 - y)}{(x_3 - x_1)(y_2 - y_1) + (x_2 - x_1)(y_1 - y_3)} \\ Y = \frac{(y_3 - y_1)(x_1 - x) + (x_1 - x_3)(y_1 - y)}{(x_3 - x_1)(y_2 - y_1) + (x_2 - x_1)(y_1 - y_3)} \end{cases}$$

The second transformation 23, 36 consists in transposing the information contained in each triangle with an area A in the lower part of a square matrix G of $E(\alpha \times \sqrt{2 \times A})$ lines where E represents the higher integer part of the value between brackets and $\alpha \in R^{+,*}$ represents a scale factor that acts on the visual representation of the image in obtaining an expansion ($\alpha > 1$) or a compression ($\alpha < 1$) in the space domain.

According to the formulae (1) and (2), we have:

$$F(m,n) = F(n,m)$$

for $I(x,y) = I(x,y)$ owing to the symmetrization 35.

After symmetrization of G, its transformation 24 according to the equation (1) generates an equally symmetrical matrix H.

Consequently, the information contained in the upper part of each matrix G being identical to the upper part (25), the use of the block-based DCT transform 24 may be implemented as for example in MPEG or JPEG.

After transformation 24, only the lower parts of the matrices H will be quantified (25) and encoded (26).

In order to optimize the performances of the cost of encoding 26, two means of action have to be implemented. These are modulated for example as a function of the relevance of the texture underlying the triangles considered, namely:
- the scale factor $\alpha$ (then $\alpha > 1$ will be taken);
- the choice of the quantification and, especially, the amplitude of the selected quantification pitch values.

Among the possible quantification operations 25, it is possible to use especially:
- a uniform quantification;
- a zigzag route quantification;
- a quantification by the use of a pre-evaluated weighting matrix on a psycho-visual criterion.

Figure 5:
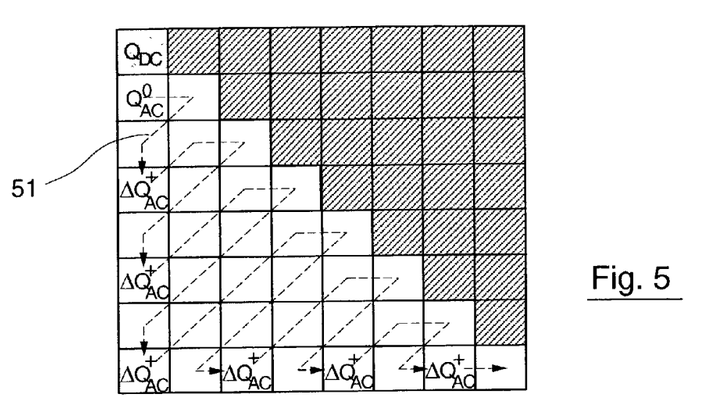
FIGS. 5 and 6 show two modes of quantification that can be used in the method of FIG. 2.

The zigzag route quantification consists in initializing the quantification process at a value $Q^0_{AC}$ which, during the route, at each rise, is incremented by a value $\Delta_{AC}$ as shown by the arrow 51 in FIG. 5.

Figure 6:
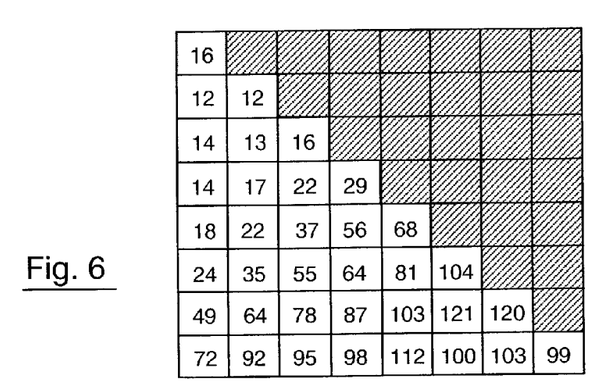

An exemplary weighting matrix pre-assessed on a psycho-visual criterion is the JPEG standard QM matrix shown in FIG. 6. The matrix of the MPEG4 standard can also be considered. Since the matrices G and QM may be of different sizes, an interpolation will be made of the matrix QM reducing this matrix to the size of G as for JPEG. It is then possible to define a quality factor qf acting as a multiplier for the matrix QM. It is also possible to implement an optimized weighting matrix for the processed image.

Figure 7:
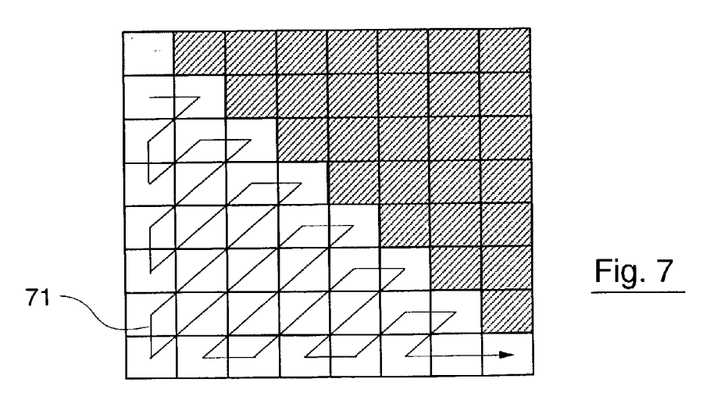
FIG. 7 illustrates the zigzag route of the encoding step of the method of FIG. 2.

The effective encoding 26 is for example achieved by carrying out an RLE (Run Length Encoding) and entropic type encoding on the zigzag route 71 as shown in FIG. 7.

It can clearly be seen that the method described here above may be used alone on full images.

It can also advantageously be implemented on image portions as a complement of another encoding approach. In particular, it may advantageously be used selectively on particular regions of the image, especially on the highly textured parts.

Thus, for example, the method of the invention proves to be particularly well suited to the encoding technique described in the patent application FR-98 12 525 filed on behalf of the owners of the present patent application entitled "Method for the encoding of fixed or moving images with reduction and adaptation of the bit rate". Indeed, it would seem that this technique has difficulties in representing textures.

Before showing how the method of the invention can be used, we shall briefly recall the principle of the method described in the patent application FR-98 12 525.

An object of this technique is a method for the encoding of a digital image aimed at producing a binary string representing this image, the length of the binary string being a function of the desired representation. This method resumes the following steps:

the defining, on an image of the image to be encoded, of a hierarchical mesh comprising a plurality of nested meshes for which the mesh element or patch peaks may be pixels of said image;

carrying out the optimizations of luminance, chrominance and positions on each mesh level;

determining a luminance deviation, for each patch of said hierarchical mesh, between the image to be encoded and an interpolated image obtained on the peaks of the nested mesh to which the patch considered belongs; and introducing, into the binary string, the values (advantageously coded differentially with respect to the previous hierarchical level) of positions, luminance and chrominance of the peaks of the patches whose luminance deviation is greater than a threshold difference.

It will be noted that this technique is not limited to the signals of luminance and chrominance but can be applied to any model of colors.

The method of the present invention may advantageously come into play in the computation of this threshold difference.

Figure 8:
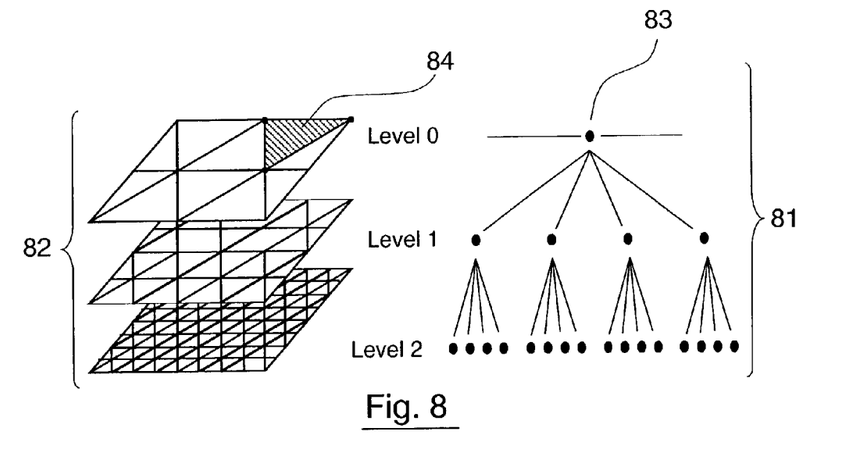
FIG. 8 illustrates the correspondence between the nested mesh and the quaternary tree in a hierarchical encoding method.

Indeed, according to the prior art, and as shown in FIG. 8, at the end of the mesh step, a quaternary tree structure 81 is constructed. This structure is associated with a hierarchical mesh 82. It is used to manipulate the values (colors and positions) of the peaks of the patches. The tree 81 has a number of nodes equal to the number of triangles in the corresponding mesh level. Each node 83 of the tree relates to a single triangle 84 of the hierarchical mesh 82.

Once the tree 81 is built, it is necessary to determine the data of the tree to be introduced into the binary string representing the image. This determination depends on the desired quality.

To make this determination, it is planned, for each triangle, to compute a luminance deviation between the image to be encoded and the interpolated image from the peaks of the nested mesh to which the considered patch belongs. This deviation is then compared with the threshold for each triangle. The value of the threshold difference is a function of the desired quality of representation.

Figure 9:
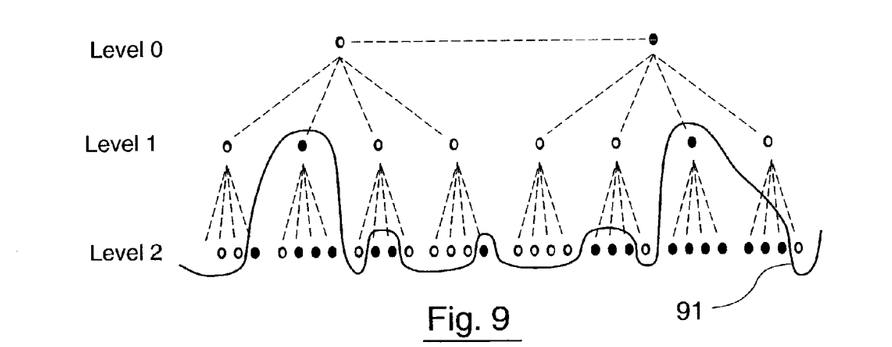
FIG. 9 is an exemplary selection of the nodes of the tree of FIG. 8 on which the method of FIG. 2 will be implemented.

Then, the part of the tree pertaining to the triangles whose luminance deviation is greater is introduced into the binary string. This selection of the nodes of the tree by a route in depth is illustrated in FIG. 9. Only the nodes found above the borderline 91 are kept.

The threshold difference therefore makes it possible to transmit the data pertaining to the image as a function of the local quality of these different triangular partitions. Indeed, on a textured part, the transmission of the data takes place up to the last mesh level (the finest mesh) and for the smoother parts a rough level proves to be sufficient.

According to the present invention, it is advantageously possible to mix the two approaches, namely the affine transformation symmetrized and transformed by DCT (for the sake of conciseness, this operation is hereinafter called DCT) with the nested meshes technique that has just been described.

Indeed, according to this nested meshes technique, first of all in the domain of the image to be encoded, a hierarchical mesh comprising a plurality of nested meshes is defined. The peaks of these meshes are the pixels of the image to be encoded. This mesh is obtained for example by regular and successive division of the patches of the rough mesh.

According to the present invention, the operation is positioned at a mesh level n (between the first and last mesh level), the image interpolated by the technique of hierarchical mesh is computed and an error image, corresponding to the luminance deviation between the original image and the interpolation image, is deduced therefrom.

The tree pertaining to the n first mesh levels are then constructed and the luminance deviation for each of the triangles of the mesh of the error image is computed and a threshold difference S is chosen. The criterion of the luminance deviation on a triangle T corresponds to the following mean squared error:

$$E_T = \sum_{x,y \in T} (I_{interp}(x, y) - I_{orig}(x, y))_2 = \sum_{x,y \in T} I_2(x, y)$$

With I as the error image between the interpolated image and the original image on the triangle T.

Figure 10:
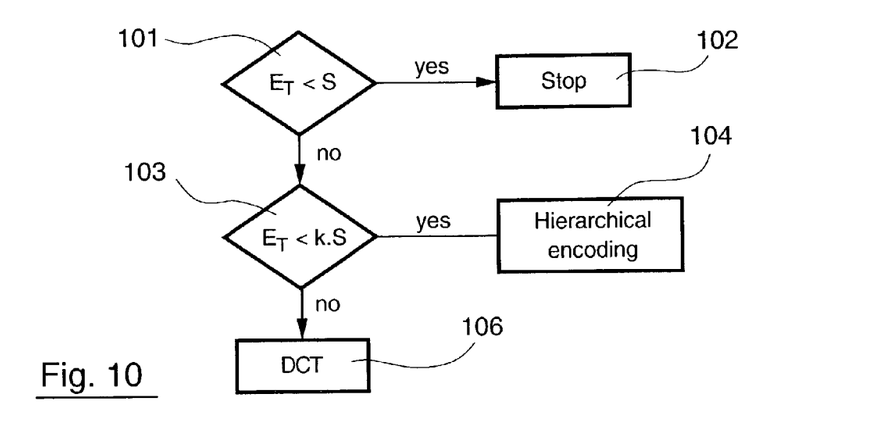
FIG. 10 is a simplified flow chart illustrating the choice of the processing to be done when the method of the invention and a hierarchical encoding are implemented in an associated way.

According to the present invention, the nodes of the tree by which it can be specified whether the approximation method must stop, whether the subdividing of the mesh by affine interpolation with the hierarchical mesh technique must be continued or whether the DCT must be continued according to the technique described here above, are determined. For this purpose, it is possible to use the method described in FIG. 10. If, for the given level n, the luminance deviation of a triangle T of the mesh is:

101: below the threshold difference: the part of the image interpolated on this triangle has a good visual quality and the procedure stops (102);

103: higher than the threshold difference but smaller than k×S, with k≧1: the approximation method continues with the hierarchical mesh technique (104), the part of the interpolated image corresponding to an average textured image;

105: greater than k×S with k≧1: the triangle is processed by a DCT applied to the triangle of the error image (106).

This selection can be justified as follows. It is known that:

$$|F(m, n)| \leq \sum_{x=0}^{M-1} \sum_{y=0}^{N-1} |I(x, y)a(x, y, m, n)| \text{ according to (1)}$$

whence:

$$|F(m, n)| \leq 2 \times \sum_{x=0}^{M-1} \sum_{y=0}^{N-1} |I(x, y)|$$

therefore:

$$\exists l \geq \frac{1}{\text{Min}_{x,y}|I(x, y)|}, |F(m, n)| \leq 2 \times l \times \sum_{x=0}^{M-1} \sum_{y=0}^{N-1} I^2(x, y)$$

It is therefore noted that the coefficient F(m, n) tends towards zero when the luminance deviation tends towards zero. A small mean square error leads to coefficients AC after low amplitude transform having high chances of being cancelled after quantification.

Thus, it proves to be judicious to perform an affine interpolation, less costly than a DCT transformation, on patches such as these.

The comprehensive method therefore consists in processing a part of the image by the hierarchical mesh technique and processing the highly textured parts of this image by a DCT according to the present invention applied to triangles of the corresponding error image.

Here, therefore, on the textured part of the error image, a DCT is applied to the triangles whose luminance deviation is great.

Furthermore, the hierarchical mesh technique is only an example. The technique of the invention implementing a DCT on triangles may be used by any other technique implementing triangles such as for example:

the methods based on fractal decomposition: the principle of image compression into gray levels by the IFS method, also called fractal compression, relies on the expression of the contents of the image by means of the contents themselves. It may be seen as a self-quantification of the image. The formalizing of this method arises especially out of the work of Hutchinson in 1981 and the work of Bradley, Demo and other research workers of the Georgia Institute of Technology between 1985 and 1988. The first automatic algorithm applying these ideas to image compression was proposed by Jacquin in 1989.

Improvements to these techniques are proposed in the patent document FR-99 00656 entitled "Procédé et dispositif de codage à base de schémas IFS, à fonctions de collage oscillantes, procédé de codage, fonction de collage, support de données et applications correspondants" ("Method and device of encoding on the basis of the IFS patterns, with oscillating bonding functions, encoding methods, bonding function, data carrier and corresponding applications");

methods known as matching pursuit methods described especially in the article by Ralph Neff and Avideh Zakhor entitled "Very low bit rate video coding based on matching pursuits", published in IEEE Transactions on Circuits and Systems for Video Technology.

The encoding (of the residue) by matching pursuit is an iterative method that uses a dictionary of redundant functions. At each iteration, the function that best represents the residue obtained in the previous step is sought. Thus, the image is broken down on a sequence of atoms which represents it in an optimal way;

the SADCT (Shape Adaptive DCT) described for example by T. Sikora and B. Makai in "Shape adaptive DCT for generic coding" (IEEE Transactions on Circuits and Systems for Video Technology, 5(1), pp. 59–62, February 1995).

The invention also relates to the decoding of the data encoded according to the encoding method described here above. This decoding method is deduced directly from the encoding steps.

Thus, when a preliminary encoding, especially of a hierarchical type, has been implemented, the decoding relies on the reception of a binary string comprising:

the description of an initial representation of the image coming from the prior encoding (which shall be subjected to a preliminary symmetrical decoding);

the values quantified and encoded after DCT transformation associated with the selected triangles.

The weighting coefficients of the matrices may be transmitted in the binary string. However preferably they are known to the decoder.

The decoding of the values quantified and encoded after DCT transformation comprise especially the following steps:

the creation of a symmetrical square matrix whose lower part comprises the decoded coefficients of the triangle to be represented, read in the binary string;

inverse DCT transformation of the matrix thus created;

the affine transformation of the isosceles rectangular triangle associated with the lower part of the matrix, towards the triangle to be represented.

When the preliminary encoding relies on a hierarchical meshing, the corresponding decoding carries out the reading in the received binary string:

the number of levels of the hierarchy of:

the identification of the encoding technique used for each of the triangles;

the sequence of the differential values of the components associated with the nodes of said hierarchical mesh.

What is claimed is:

1. Image encoding method, characterized in that it comprises, for a field corresponding to at least one image portion, the following steps:

the definition (21) of a minimum triangular partition overlapping said domain thereby defining source triangles;

the association, with each of said source triangles, of a square matrix (34) representing said source triangle (31), by means of a first invertible transformation (22, 23);

the application (24) of a second decorrelating invertible transformation to each of said square matrices, delivering transformed matrices.

2. Image encoding method according to the claim 1, characterized in that said step of associating a square matrix comprises the following steps:

the affine transformation (32) of a source triangle (31) into an isosceles rectangular triangle (33) called a reference triangle;

the creation (36) of a square matrix (34) whose lower part includes data representing said isosceles rectangular triangle (33);

the symmetrizing (35) of said square matrix.

3. Image encoding method according to the claim 2, characterized in that said step for the creation (36) of a square matrix implements a scale factor enabling an expansion or compression in the space domain.

4. Image encoding method according to the claim 3, characterized in that said square matrix may comprise E(αx $\sqrt{2 \times A}$) lines where E represents the higher integer part, A being the area of said isosceles rectangular triangle.

5. Image encoding method according to claim 1, characterized in that said second transformation belongs to the group comprising:
the Karhunen Loève transformation (KLT),
the discrete Fourier transformation (DFT),
the discrete cosine transformation (DCT),
and the Walsh-Hadamard transformation (WHT).

6. Image encoding method according to claim 1, characterized in that it comprises a step for the quantification (25) and encoding (26) of data of the lower part of said transformed matrix.

7. Image encoding method according to the claim 6, characterized in that said quantification (25) belongs to the group comprising:
a uniform quantification;
a zigzag route quantification, the quantification pitch being incremented as and when the route is travelled;
a quantification based on at least one weighting matrix that is pre-evaluated or optimized for the processed image.

8. Image encoding method according to claim 4, characterized in that said scale factor $\alpha$, the type of quantification and/or the quantification pitch can be modified for each of said triangles and/or for each of said image portions.

9. Image encoding method according to claim 6, characterized in that it comprises a step of RLE (Run Length Encoding) and entropic coding (26) of the quantified data.

10. Image encoding method according to claim 1, characterized in that said triangular partition is obtained according to a method that takes account of the contents of the image or the image portion.

11. Image encoding method according to claim 10, characterized in that said method advantageously belongs to the group comprising:
methods based on fractal decomposition;
matching pursuit methods;
methods implementing an SADCT ("Shape Adapative DCT"):
methods implementing a DCT.

12. Image encoding method according to claim 1, characterized in that it is implemented (106) on image portions having a texture whose representation error is above a given threshold (103).

13. Image encoding method according to claim 1, characterized in that said representation error corresponds to a luminance deviation between said source triangle and the triangle after reconstruction.

14. Image encoding method according to claim 1, characterized in that it is implemented on an error image corresponding to the deviation between the source image and an approximate image, obtained by implementing a preliminary distinct method of encoding.

15. Image encoding method according to the claim 14, characterized in that said preliminary method of encoding is a method of approximation by refining that implements a hierarchical mesh from which a quaternary tree is constructed having as many levels as there are levels in said hierarchical mesh, each of said levels having a number of nodes equal to the number of triangles in the corresponding mesh level,
and in that, for nodes meeting a predetermined criterion (103), said preliminary encoding is advantageously replaced by an encoding according to claim 1.

16. Image encoding method according to the claim 15, characterized in that said predetermined criterion relies on the luminance deviation between the triangle of the approximate image and that of the source image.

17. Image encoding method according to the claim 16, characterized in that, for each node:
a luminance deviation between the image to be encoded and the image interpolated on the triangle is computed from the peaks of the nested mesh to which the node considered belongs;
said luminance deviation is compared with a threshold difference;
the following choices are made:
if said luminance deviation is below said threshold difference, the approximation method is interrupted by the refining of the hierarchical mesh for the node considered;
if said luminance deviation is higher than said threshold difference but below a second threshold, said method implementing a hierarchical mesh (106) continues (104) to be applied;
if said luminance deviation is higher than said second threshold, the encoding method according to claim 1 is implemented.

18. Image encoding method according to the claim 17, characterized in that said second threshold is equal to k×S with:
k: real number greater than or equal to 1;
S: real value proportional to the mean error luminance deviation.

19. Image encoding method according to claim 16, characterized in that said luminance deviation represents a mean squared error or an absolute error between said source triangle and the corresponding approximate triangle.

20. Method for the decoding of data representing an image encoded according to a method comprising, for a field corresponding to at least one image portion, the following steps:
the definition of a minimum triangular partition overlapping said domain thereby defining source triangles;
the association, with each of said source triangles, of a square matrix representing said source triangle, by means of a first invertible transformation;
the application of a second decorrelating invertible transformation to each of said square matrices, delivering transformed matrices,
characterized in that it comprises the following steps of reconstruction of an approximation of the original image:
a) the application of a inverse transformation to said second invertible decorrelation transformation on said transformed matrices, delivering said reconstructed square matrices;
b) the association, with each of said reconstructed square matrices, of a corresponding reconstructed triangle by means of an affine transformation that is the inverse of said first invertible transformation;
c) the reconstruction of said minimum partition from said reconstructed triangle.

21. Decoding method according to the claim 20, characterized in that said square matrices are recreated from data of a received binary string whose decoded data are the coefficients of the triangle to be reconstructed which form the lower part of said matrix.

22. Decoding method according to claim 20, characterized in that it implements the steps a), b) and c) on one part of the received binary string only, the other part of the binary string having been encoded and being decoded according to another method.

23. Decoding method according to the claim 22, characterized in that said binary string comprises, firstly, data encoded according to a preliminary encoding method and, secondly, data encoded by means of said invertible transformations, said decoding method comprising:
- a preliminary decoding of said data encoded according to a preliminary encoding, enabling the description of an initial representation;
- a complementary decoding of said data encoded by means of said invertible transformations, implementing steps a), b) and c) and enabling the refining of said initial representation.

24. Decoding method according to claim 22, characterized in that, with said preliminary encoding implementing a hierarchical coding, said preliminary decoding provides for the reading, in the received binary string, of at least one of the pieces of information belonging to the group comprising:
- the number of levels of the hierarchy;
- the identification of the encoding technique used for each of the triangles;
- the succession of the differential values of the components associated with the nodes of said hierarchical mesh;
- the identification of the arcs on which a diagonal inversion is made.

25. Image encoding method according to claim 1, wherein each transformed matrix represents one of said source triangles.

* * * * *